US012754952B2

(12) United States Patent
Terayama

(10) Patent No.: US 12,754,952 B2
(45) Date of Patent: Oct. 6, 2026

(54) COMMUNICATION APPARATUS, CONTROL METHOD THEREFOR, AND STORAGE MEDIUM

(71) Applicant: CANON KABUSHIKI KAISHA, Tokyo (JP)

(72) Inventor: Kota Terayama, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/046,979

(22) Filed: Feb. 6, 2025

(65) Prior Publication Data

US 2025/0265291 A1 Aug. 21, 2025

(30) Foreign Application Priority Data

Feb. 19, 2024 (JP) ................................ 2024-023038

(51) Int. Cl.

*G06F 16/54* (2019.01)
*G06F 3/14* (2006.01)
*G06F 16/538* (2019.01)

(52) U.S. Cl.

CPC ................ *G06F 16/54* (2019.01); *G06F 3/14* (2013.01); *G06F 16/538* (2019.01)

(58) Field of Classification Search

CPC ............................... G06F 16/54; G06F 16/538

(Continued)

(56) References Cited

U.S. PATENT DOCUMENTS 7,523,398 B2 * 4/2009 Watanabe ............. G06F 3/0482 715/825
10,362,216 B2 * 7/2019 Shimokura ............ H04N 23/63

(Continued)

FOREIGN PATENT DOCUMENTS

JP 2001169224 A 6/2001
JP 2001177745 A 6/2001

(Continued)

OTHER PUBLICATIONS

English translation of Wo2023281928A1. Jan. 12, 2023 https://patents.google.com/patent/WO2023281928A1/en?oq=WO2023281928 (Year: 2023).*

(Continued)

*Primary Examiner* — Kimberly L Wilson
(74) *Attorney, Agent, or Firm* — Cowan, Liebowitz & Latman, P.C.

(57) ABSTRACT

A communication apparatus includes a first obtaining unit configured to obtain information of a plurality of image data files from a first external apparatus, a display control unit configured to display at least a portion of the information of the plurality of image data files, a selecting unit configured to select at least one image data file from the information of the plurality of image data files, a second obtaining unit configured to obtain an image data file selected by the selecting unit from the first external apparatus, and a transferring unit configured to transfer the obtained image data file to a second external apparatus. The display control unit determines which storage medium to preferentially display information on a basis of at least one of type information and model information of the first external apparatus.

10 Claims, 9 Drawing Sheets

(58) Field of Classification Search
USPC .......................................................... 707/722
See application file for complete search history.

(56) References Cited

U.S. PATENT DOCUMENTS

| | | | | |
|---|---|---|---|---|
| 10,771,681 | B2 * | 9/2020 | Shimokura ............ | H04N 23/63 |
| 2001/0006400 | A1 * | 7/2001 | Kubo ................... | H04N 1/2112<br>348/333.01 |
| 2012/0229672 | A1 * | 9/2012 | Cok ....................... | H04N 5/765<br>348/231.2 |
| 2024/0119024 | A1 * | 4/2024 | Asano ................... | G06F 16/122 |
| 2024/0160658 | A1 * | 5/2024 | Sato ...................... | G06F 3/0482 |

FOREIGN PATENT DOCUMENTS

| | | | |
|---|---|---|---|
| JP | 2012014655 | A | 1/2012 |
| JP | 2017526318 | A | 9/2017 |
| JP | 2023009680 | A | 1/2023 |
| JP | 2023022710 | A | 2/2023 |

OTHER PUBLICATIONS

English Abstract for JP2001177745 (Year: 2001).*
English Abstract for JP2012014655 (Year: 2012).*

* cited by examiner

| TYPE | MODEL | STORE PROXY | SLOT 1 | SLOT 2 |
| --- | --- | --- | --- | --- |
| TYPE M | MODEL MA | ON | SD A | **SD B** |
| | | OFF | **SD A** | SD B |
| | MODEL MB | ON | CFexpress A | **CFexpress B** |
| | | OFF | **CFexpress A** | CFexpress B |
| | MODEL MC | FUNCTION NONE | **CFexpress** | SD |
| | MODEL M# | ON | ... | ... |
| | | OFF | ... | ... |
| TYPE S | MODEL SA | FUNCTION NONE | **CFexpress** | SD |
| | MODEL SB | ON | **CFexpress 1** | CFexpress 2 |
| | | OFF | **CFexpress 1** | CFexpress 2 |
| | MODEL SC | FUNCTION NONE | **SD 1** | SD 2 |
| | MODEL S# | FUNCTION NONE | ... | ... |

COMMUNICATION APPARATUS, CONTROL METHOD THEREFOR, AND STORAGE MEDIUM

BACKGROUND OF THE INVENTION

Field of the Invention

The present invention relates to a communication apparatus and a control method therefor.

Description of the Related Art

A known communication apparatus includes a function for obtaining an image file stored by an image capture apparatus and transferring the image file to a server.

As described in Japanese Patent Laid-Open No. 2001-169224, for example, in a case where the image capture apparatus includes a plurality of slots for installing detachable storage medium, the communication apparatus can select the storage medium or the slot to read out the image file.

However, known communication apparatuses are configured to always first select a specific slot. Thus, in a case where an image file is wished to be obtained from a slot that is not initially selected, the user must re-select this slot.

Also, in a case where the user does not know or has forgotten about a slot where image files of a format wished to be obtained are stored, the user has to select each one of the slots and check the displayed list of image files. Furthermore, in a case where the user uses a plurality of image capture apparatuses, for each image capture apparatus the user connects to, the user has to select the slot where the image files of the format wished to be obtained are stored.

SUMMARY OF THE INVENTION

The present invention has been made in consideration of the aforementioned problems and realizes an enhancement to user-friendliness when obtaining an image file from an image capture apparatus.

According to a first aspect of the present invention, there is provided a communication apparatus comprising: at least one processor or circuit and a memory storing instructions to cause the at least one processor or circuit to perform operations of the following units: a first obtaining unit configured to obtain information of a plurality of image data files from a first external apparatus storing the plurality of image data files using at least one of a plurality of storage mediums; a display control unit configured to display at least a portion of the information of the plurality of image data files on a display device; a selecting unit configured to select at least one image data file from the information of the plurality of image data files displayed on the display device; a second obtaining unit configured to obtain an image data file selected by the selecting unit from the first external apparatus; and a transferring unit configured to transfer the obtained image data file to a second external apparatus different from the first external apparatus, wherein the display control unit determines which storage medium, from among the plurality of storage mediums, to preferentially display, on the display device, information of an image data file stored thereon on a basis of at least one of type information and model information of the first external apparatus.

According to a second aspect of the present invention, there is provided a method of controlling a communication apparatus comprising: obtaining information of a plurality of image data files from a first external apparatus storing the plurality of image data files using at least one of a plurality of storage mediums; performing display control to display at least a portion of the information of the plurality of image data files on a display device; selecting at least one image data file from the information of the plurality of image data files displayed on the display device; obtaining an image data file selected by the selecting from the first external apparatus; and transferring the obtained image data file to a second external apparatus different from the first external apparatus, wherein the display control determines which storage medium, from among the plurality of storage mediums, to preferentially display, on the display device, information of an image data file stored thereon on a basis of at least one of type information and model information of the first external apparatus.

Further features of the present invention will become apparent from the following description of exemplary embodiments with reference to the attached drawings.

DESCRIPTION OF THE EMBODIMENTS

Figure 1:
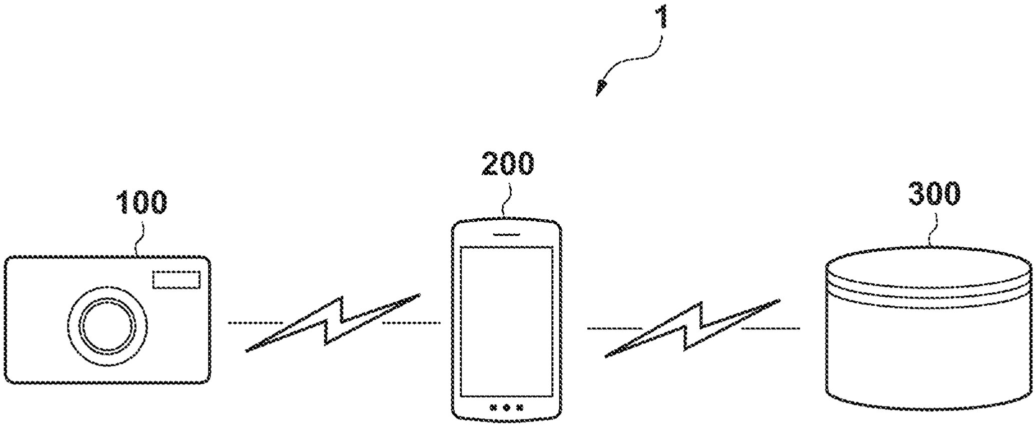
FIG. 1 is a schematic view illustrating an example of the configuration of an image transfer system according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that an embodiment of the present invention in which a smartphone is used as an example of a communication apparatus will be described below. However, the present invention can be implemented using any electronic device that can communicate with two or more external devices including an image capture apparatus, with examples including a computer device (personal computer, tablet, media player, PDA, and the like), a game console, a robot, and the like. These are examples, and the present invention can be implemented using other electronic devices.

Image Transfer System

FIG. 1 is a schematic view illustrating an example of the configuration of an image transfer system 1 including a communication apparatus according to an embodiment of the present invention.

The image transfer system 1 includes an image capture apparatus 100, a communication apparatus 200, and an information processing apparatus 300. The image capture apparatus 100 (first external apparatus) is represented by a digital camera or a digital video camera. In the present embodiment, the communication apparatus 200 is a smartphone or a tablet. The information processing apparatus 300 (second external apparatus) is a server apparatus or cloud storage that stores image files.

The image capture apparatus 100 and the information processing apparatus 300 each communicate with the communication apparatus 200. The image capture apparatus 100 and the communication apparatus 200 can communicate via a wired connection using a cable or via a wireless connection, for example. Also, the communication apparatus 200 and the information processing apparatus 300 can communicate via a connection using 4G, 5G, or a similar mobile communication network, the Internet, or the like.

Note that the communication protocol for communications between the image capture apparatus 100 and the communication apparatus 200 and the communication protocol for communications between the communication apparatus 200 and the information processing apparatus 300 are not particularly limited. Each may use a known communication protocol. For example, in the case of transferring an image file from the image capture apparatus 100 to the communication apparatus 200, Picture Transfer Protocol (PTP) or PTP over TCP/IP networks (PTP-IP) may be used. Also, in the case of transferring an image file from the communication apparatus 200 to the information processing apparatus 300, File Transfer Protocol (FTP) may be used.

Note that in the example illustrated in FIG. 1, the image capture apparatus 100 and the information processing apparatus 300 are on different communication networks. However, for example, the image capture apparatus 100, the communication apparatus 200, and the information processing apparatus 300 may be all on the same network provided by the same access point. However, in this case, an image file is transferred from the image capture apparatus 100 to the information processing apparatus 300 via the communication apparatus 200.

Configuration of Image Capture Apparatus 100

Figure 2A:
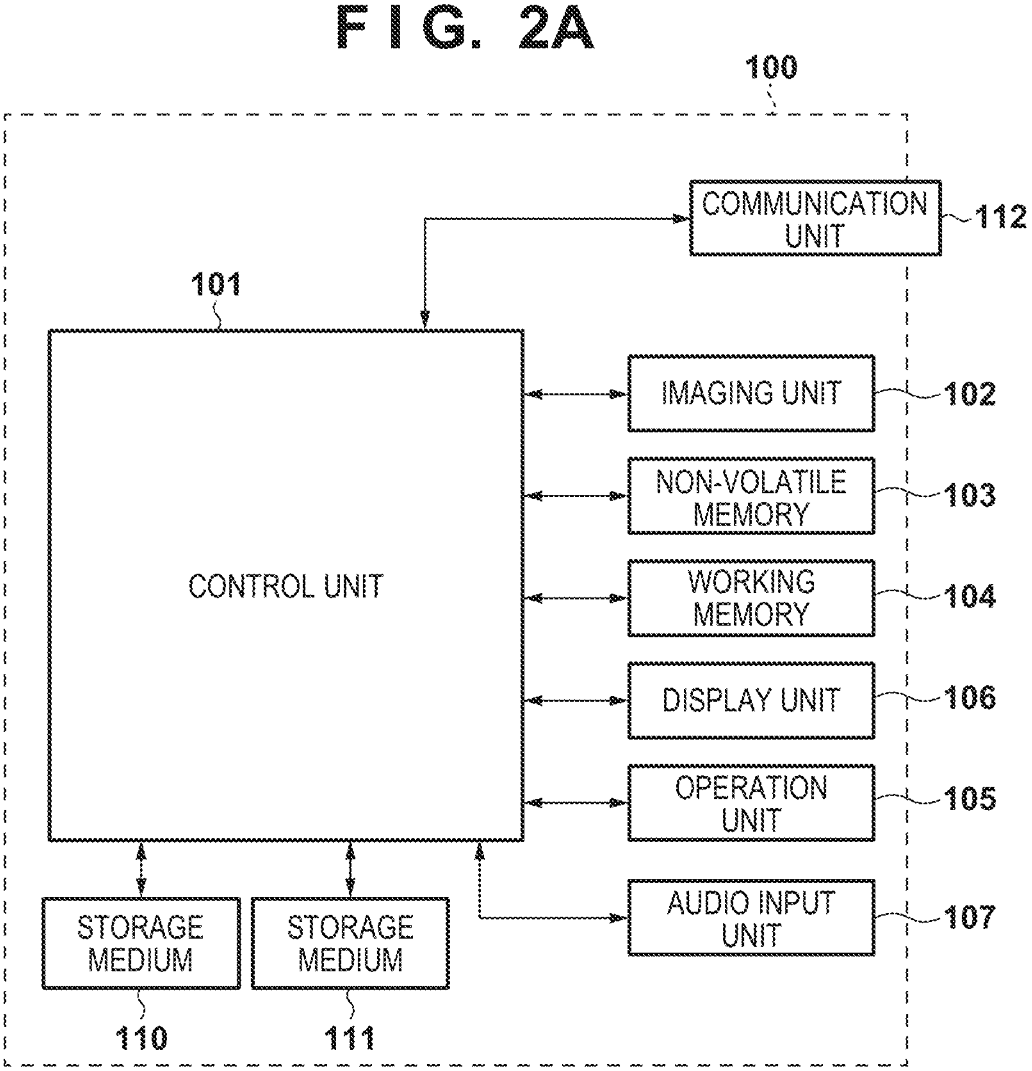
FIGS. 2A to 2C are block diagrams illustrating examples of the configuration of an image capture apparatus.

FIG. 2A is a block diagram illustrating an example of the hardware configuration of the image capture apparatus 100.

A control unit 101 includes one or more microprocessors (MPU), for example. The control unit 101 controls the operation of each block illustrated in FIG. 2A and executes the functions of the image capture apparatus 100 by loading a program stored in a non-volatile memory 103 onto a working memory 104 and executing the program using the MPU. Note that at least a portion of the control for implementing the functions of the image capture apparatus 100 may be implement using a hardware circuit such as an ASIC, FPGA, or the like.

An imaging unit 102 includes a lens unit with a built-in focusing optical system including a movable lens such as a focus lens and a diaphragm and an image sensor. The lens unit further includes a driving mechanism of the movable lens and the diaphragm. The image sensor includes a plurality of pixels in a two-dimensional array. Each pixel is provided with a photoelectric conversion element such as a photodiode, for example. The image sensor converts the optical image formed by the lens unit via the plurality of pixels into a pixel signal group (analog image signal). A complementary metal oxide semiconductor (CMOS) image sensor, a charge coupled device (CCD), or the like is used as the image sensor, for example. The imaging unit 102 executes A/D conversion, noise reduction processing, and the like on the analog image signal generated by the image sensor and outputs this as image data.

The control unit 101 applies a predetermined image processing to the image data output by the imaging unit 102 and generates image data for display and image data for storing. The image data for display is used in display by the display unit 106, for example. Also, the image data for storing is stored in at least one of a storage medium 110 and a storage medium 111. The control unit 101 also generates an evaluation value from the image data using automatic focus detection (AF) and automatic exposure control (AE) and can perform AF and AE on the basis of an evaluation value.

The non-volatile memory 103 is electrically rewritable and stores programs executed by the control unit 101, settings of the image capture apparatus 100, GUI data, metatemplate information, and the like.

The working memory 104 is used as a buffer memory for temporarily holding image data, a system memory for executing programs, a video memory of the display unit 106, and the like.

An operation unit 105 is a generic term for an input device for receiving instructions for the image capture apparatus 100. The operation unit 105 includes a switch, a button, a key, a dial, a joy stick, a touch panel, and the like. The input device has a name in accordance with its allocated function. Examples include a power button for the user to issue an ON/OFF instruction for the power of the image capture apparatus 100, a release switch to issue a start/stop image capture instruction, and a playback button to issue a moving image data playback instruction, and the like. Note that depending on the operation state of the image capture apparatus 100, the same input device may be allocated with different functions. The operation unit 105 also includes a connect button for starting communication with an external device via a communication unit 112 described below and a touch panel of the display unit 106 described below.

The display unit 106 displays a live view image, captured image data, a menu screen, information of the image capture apparatus 100, and the like. Note that the display unit 106 may be a display apparatus external to the image capture apparatus 100.

An audio input unit 107 is a microphone, for example, that is used to obtain the environment sound when capturing moving images for storing. The audio obtained via electrical signal conversion by the audio input unit 107 is converted into a predetermined format of audio by the control unit 101 and stored in the storage medium 110 and/or the storage medium 111 as an audio file.

The storage medium 110 and the storage medium 111 are used as a storage destination for image data and audio data obtained in image capture. At least one of the storage medium 110 and the storage medium 111 may be detachable from the image capture apparatus 100. Typically, the storage medium 110 and the storage medium 111 are memory cards.

In the case of using a storage medium that is detachable from the image capture apparatus 100, the image capture apparatus 100 is provided with a mechanism for accessing the installed detachable storage medium. In a case where the storage medium is a memory card, the mechanism is referred to as a memory slot. In the present embodiment, the storage medium 110 and the storage medium 111 are memory cards, and the image capture apparatus 100 includes two memory slots.

The communication unit 112 is a communication interface with an external apparatus. The communication unit 112 includes an antenna and a communication module. The communication unit 112 may include a different communication interface for each compliant communication standard. The image capture apparatus 100 can communicate with external apparatuses such as the communication apparatus 200 via an established wired and/or wireless connection using the communication unit 112. For example, moving image data and audio data obtained via image capture can be transmitted to an external apparatus via the communication unit 112. In the present embodiment, the image capture apparatus 100 and the communication apparatus 200 communicated via a wireless connection.

Note that in the present embodiment, the communication unit 112 includes a wireless LAN interface compliant with one or more IEEE 802.11 sequence. Also, the communication unit 112 includes a universal serial bus (USB) interface compliant with one USB standard. The control unit 101 implements communication with an external apparatus connected to the communication interface by controlling the communication interface of the communication unit 112.

Note that the wireless LAN interface of the communication unit 112 includes an access point mode (AP mode) that operates as an access point in infrastructure mode and a client mode (CL mode) that operates as a client. The operation mode of the communication unit 112 is controlled by the control unit 101. When the communication unit 112 operates in CL mode, the image capture apparatus 100 operates as a client in infrastructure mode. When the image capture apparatus 100 operates as a client, by connecting to a surrounding access point, it can join the network formed by the access points.

Also, when the communication unit 112 operates in AP mode, the image capture apparatus 100 operates as a simple access point (simple AP). A simple AP has limited functions compared to a typical AP. Specifically, it does not have a gateway function for transferring data received from a client to an external network. When the image capture apparatus 100 operates as a simple AP, the image capture apparatus 100 forms a network. The apparatuses in the surroundings of the image capture apparatus 100 can recognize the image capture apparatus 100 as an access point and join the network formed by the image capture apparatus 100. Note that since the image capture apparatus 100 is a simple AP, the data received from a client cannot be transferred to an external network such as the Internet.

Figure 2B:
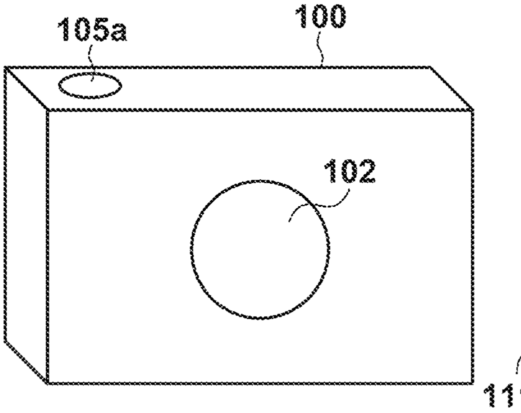
Figure 2C:
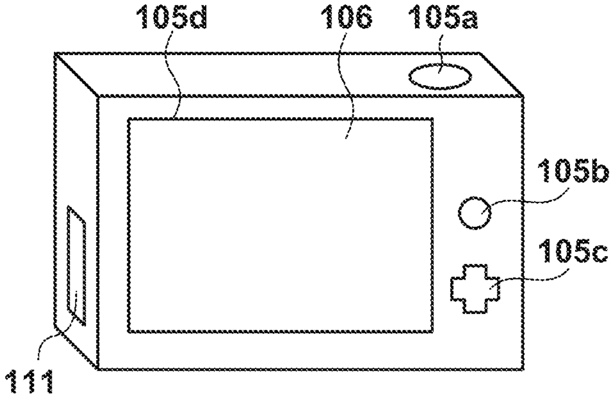

FIGS. 2B and 2C are perspective views illustrating an example of the external appearance of the image capture apparatus 100. FIG. 2B illustrates an example of the external appearance from the front side (subject side), and FIG. 2C illustrates an example of the external appearance from the back side (shooter side). The operation unit 105 includes input devices including a release switch 105*a*, a playback button 105*b*, a directional key 105*c*, and a touch panel 105*d*. When in image capture standby and when capturing moving images for storing, the display unit 106 can function as a viewfinder by displaying live view images on the display unit 106.

File Configuration of Storage Medium 110 and Storage Medium 111

Figure 3:
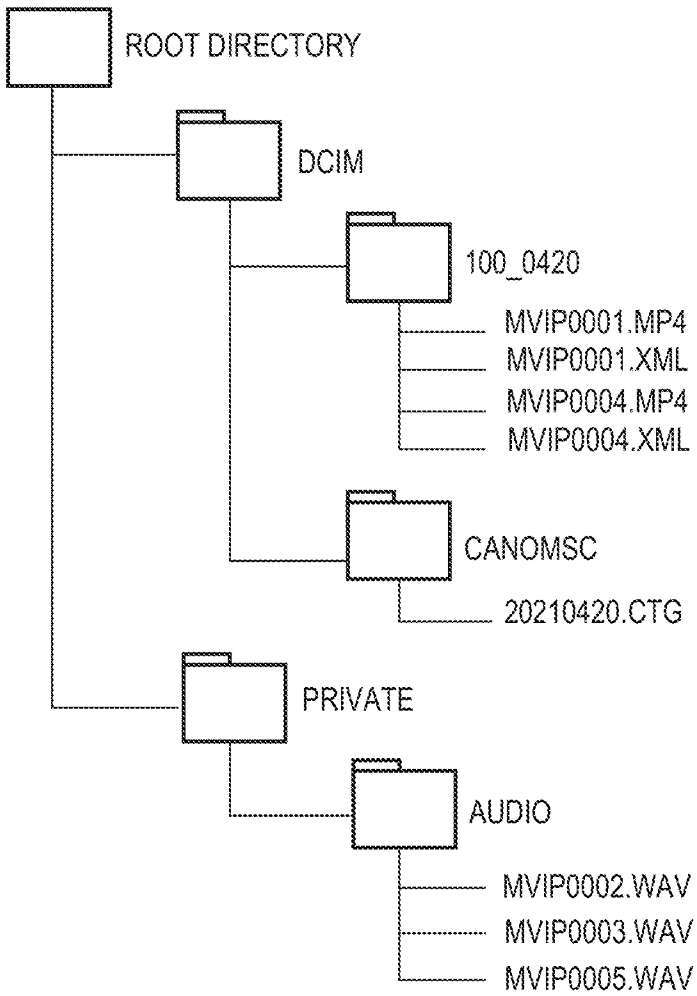
FIG. 3 is a diagram illustrating an example of the file configuration of the image capture apparatus.

Next, the file configuration of the storage medium 110 will be described using FIG. 3. The storage medium 111 also has the same file configuration.

Internally, the storage medium 110 is formatted in a file system such as an extended file allocation table (exFAT) that can be referenced from various types of operating systems (OS).

The control unit 101 stores the moving image data generated by the imaging unit 102 in a directory (here, [100_0420] (the last four characters indicating the date of recording)) per date provided in a [DCIM] directory directly below the root directory in a MP4 file format. Also, the control unit 101 stores the metadata information of the moving image data based on the metatemplate information read out from the non-volatile memory 103 in an extensible markup language (XML) file format. The metadata information is information such as the category of the moving image data, title, comments, and the like stored in association with a tag in the XML file. The metadata information is used in managing the moving image data and the like.

The control unit 101 stores the audio data generated by the audio input unit 107 in parallel with the moving image capture in an [AUDIO] directory provided in a [PRIVATE] directory directly below the root directory in a WAV file format.

Also, when the moving image data and the audio data are generated by the imaging unit 102 and the audio input unit 107, the control unit 101 generates a catalog file for file management in a [CANOMSC] directory provided in the [DCIM] directory. In a case where a catalog file already exists, the control unit 101 updates the existing catalog file. The catalog file stores information (date and time of recording and the like) of the file stored in the storage medium 110.

Note that here, only the data stored when moving images are captured is described, but still image files can also be stored in the same directories as the moving image data. Also, the file formats of the moving image data and the audio data described here are simply examples, and the data may be stored using other file formats.

Hardware Configuration of Communication Apparatus 200

Figure 4:
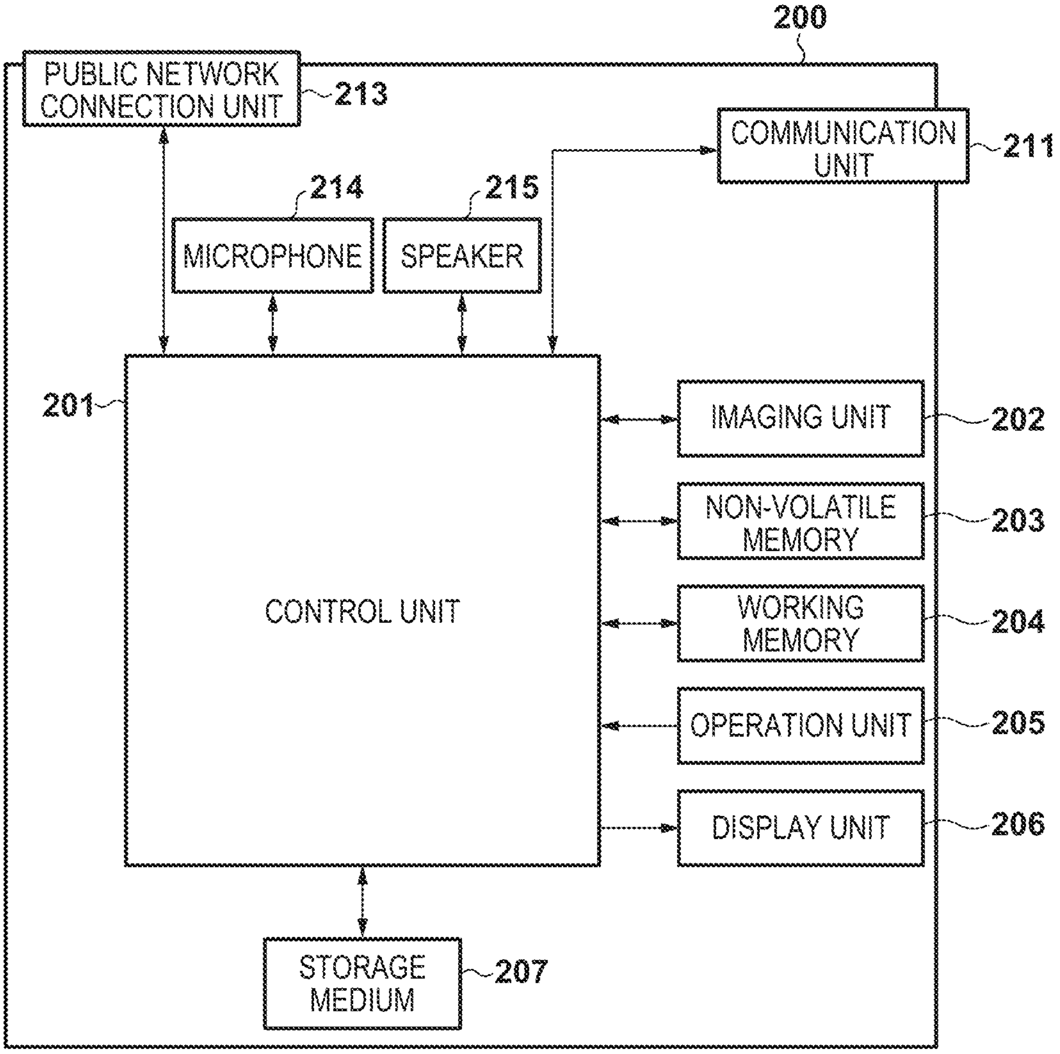
FIG. 4 is a block diagram illustrating an example of the configuration of a communication apparatus.

FIG. 4 is a block diagram illustrating an example of the hardware configuration of the communication apparatus 200. Note that here, the communication apparatus 200 is a mobile computing device terminal (for example, a smartphone, tablet, or the like) that can connect to a cellular network.

A control unit 201 includes one or more microprocessors (MPU), for example. The control unit 201 controls the operation of each block illustrated in FIG. 4 and executes the functions of the communication apparatus 200 by loading a program stored in a non-volatile memory 203 onto a working memory 204 and executing the program using the MPU. Note that at least a portion of the control for implementing the functions of the communication apparatus 200 may be implement using a hardware circuit such as an ASIC, FPGA, or the like.

An imaging unit 202 includes a lens unit with a built-in focusing optical system including a movable lens such as a focus lens and an image sensor. The lens unit further includes a driving mechanism of the movable lens. The image sensor includes a plurality of pixels in a two-dimensional array. Each pixel is provided with a photoelectric conversion element such as a photodiode, for example. The image sensor converts the optical image formed by the lens unit via the plurality of pixels into a pixel signal group (analog image signal). The image sensor uses a CMOS image sensor, a CCD, or the like, for example. The imaging unit 202 executes A/D conversion, noise reduction processing, and the like on the analog image signal generated by the image sensor and outputs this as image data.

The control unit 201 applies a predetermined image processing to the image data output by the imaging unit 202 and generates image data for display and image data for storing. The image data for display is used in display by a display unit 206, for example. Also, the image data for storing is stored in a storage medium 207. The control unit 201 also generates an evaluation value from the image data using automatic focus detection (AF) and automatic exposure control (AE) and can perform AF and AE on the basis of an evaluation value.

The non-volatile memory 203 is electrically rewritable and stores programs executed by the control unit 201, settings of the communication apparatus 200, GUI data, metatemplate information, and the like. The program includes basic software (OS) and application programs that cooperate with the OS.

Also, in the present embodiment, the following application programs are stored in the non-volatile memory 203.

A transfer application program (transfer app) that provides a data transfer function using communication between the image capture apparatus 100 and the information processing apparatus 300.

A file management application (file management app) that manages the data files received from the image capture apparatus 100.

An image management application program (image management app).

The working memory 204 is used as a buffer memory for temporarily holding image data, a system memory for executing programs, a video memory of the display unit 206, and the like.

An operation unit 205 is a generic term for an input device for receiving instructions for the communication apparatus 200. The operation unit 205 includes a switch, a button, a touch panel of the display unit 206, and the like. Note that a function for providing an instruction to the communication apparatus 200 via audio input using a microphone 214 is also included as one input device of the operation unit 205.

The display unit 206 displays a live view image, captured image data, a menu screen, information of the communication apparatus 200, and the like. Note that the display unit 206 may be a display apparatus external to the communication apparatus 200.

The storage medium 207 is used as a storage destination for image data and audio data obtained in image capture. The storage medium 207 may be detachable from the communication apparatus 200. Typically, the storage medium 207 is a memory card.

A communication unit 211 is a communication interface with an external apparatus. The communication unit 211 may include a different communication interface for each compliant communication standard. The communication apparatus 200 can communicate with external apparatuses such as the image capture apparatus 100 and the information processing apparatus 300 via an established wired and/or wireless connection using the communication unit 211. In the present embodiment, the communication apparatus 200 communicates with the image capture apparatus 100 and the information processing apparatus 300 via a wireless connection.

Note that in the present embodiment, the communication unit 211 includes a wireless LAN interface compliant with one or more IEEE 802.11 sequence. Also, the communication unit 211 includes a universal serial bus (USB) interface compliant with one USB standard. The communication unit 211 may include an infrared communication interface, a Bluetooth (registered trademark) communication interface, a Wireless USB interface, or a similar wireless communication module. The control unit 201 implements communication with an external apparatus connected to the communication interface by controlling the communication interface of the communication unit 211.

The communication apparatus 200 may communicate with the image capture apparatus 100 and the information processing apparatus 300 directly or may communicate via another device such as an access point or a relay. As the communication protocol for image data, Picture Transfer Protocol over Internet Protocol (PTP/IP) via a wireless LAN may be used, for example.

Note that the wireless LAN interface of the communication unit 211 may include an access point mode (AP mode) that operates as an access point in infrastructure mode and a client mode (CL mode) that operates as a client. The operation mode of the communication unit 211 is controlled by the control unit 201. When the communication unit 211 operates in CL mode, the communication apparatus 200 operates as a client in infrastructure mode. When the communication apparatus 200 operates as a client, by connecting to a surrounding access point, it can join the network formed by the access points.

A public network connection unit 213 is a communication interface used to connect to the cellular network. The communication apparatus 200 provides a function for calling an external device via the public network connection unit 213. The user can call the user of an external device using the microphone 214 and a speaker 215.

Note that since the cellular network provides a data communication function, the communication apparatus 200 can communicate data with an external device such as the information processing apparatus 300 via the public network connection unit 213. Note that the wireless communication interface of the communication unit 211 may use the same antenna as the public network connection unit 213 or may use a separate antenna. Note that in a case where both the communication unit 211 and the public network connection unit 213 can be used to communicate with the same external apparatus, the one with fast communication speed can be used for communication in a non-audio calling state. Note that the communication speed here may be a theoretical communication speed or a communication speed in the actual environment.

The microphone 214 is used to obtain environment sound when capturing moving images for storing. The audio data obtained via electrical signal conversion by the microphone 214 is converted into a predetermined format of audio by the control unit 201 and stored in the storage medium 207 as an audio file. The microphone 214 is used to input audio in calls via the public network connection unit 213.

The speaker 215 outputs audio generated or reproduced by the OS or an application and is used to output the audio received via the public network connection unit 213.

Software Configuration of Communication Apparatus 200

Figure 5:
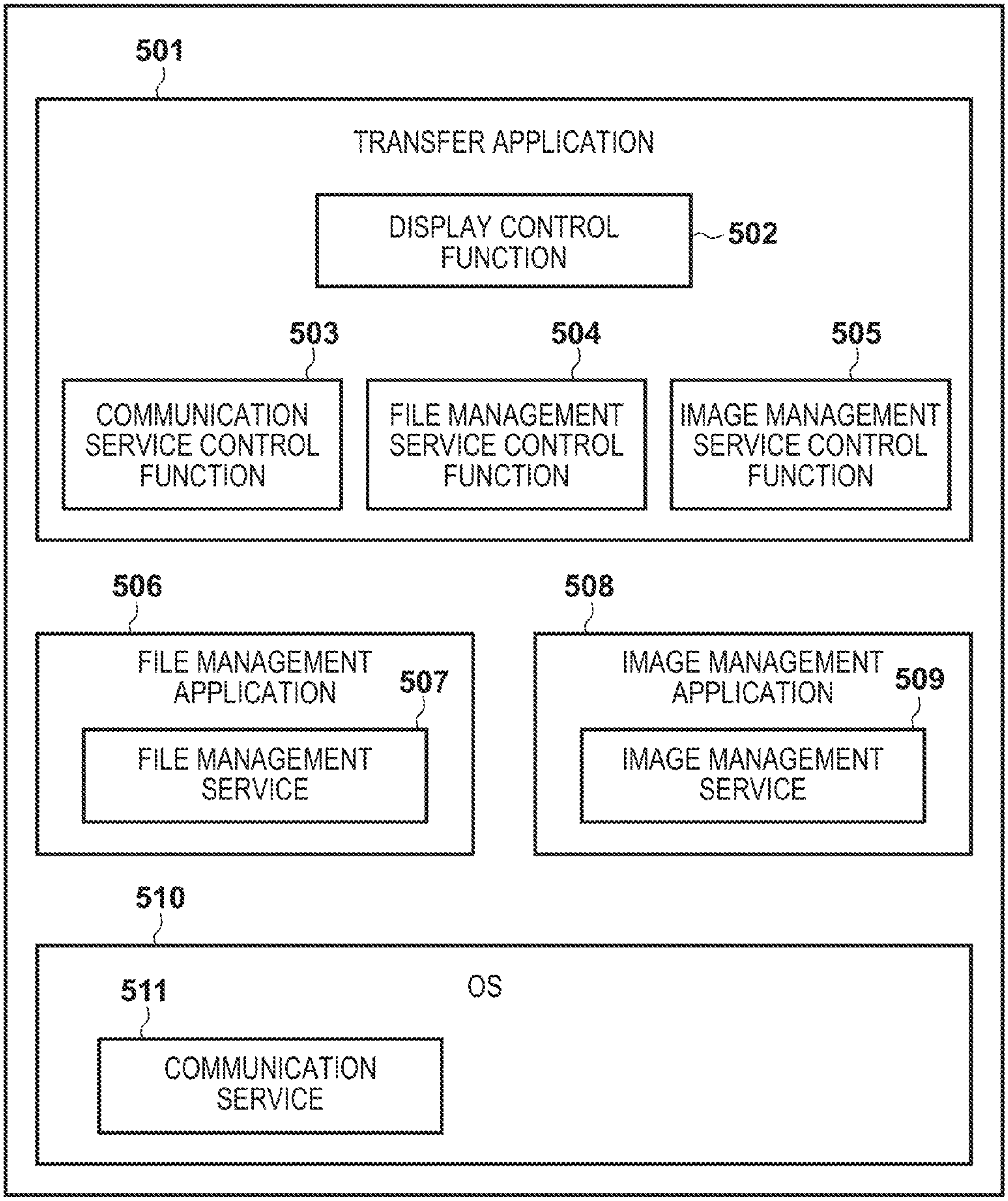
FIG. 5 is a diagram illustrating an example of the software configuration of the communication apparatus.

Next, an example of the software configuration of the communication apparatus 200 will be described using FIG. 5. FIG. 5 schematically illustrates a program stored in the non-volatile memory 203.

The non-volatile memory 203 stores an OS 510, a file management application 506, an image management application 508, and a transfer application 501. The transfer application 501 provides a function of obtaining a data file from the image capture apparatus 100 and transferring it to the information processing apparatus 300. These applications 501, 506, and 508 are installed in the communication apparatus 200 by a known method.

When a power switch included in the operation unit 205 of the communication apparatus 200 is turned on, power is supplied from the power source to each unit of the communication apparatus 200 and the start-up operation of the communication apparatus 200 is started. In the start-up operation, the control unit 201 reads out the OS 510 from the non-volatile memory 203 to the working memory 204 and executes it.

When the communication apparatus 200 has been started up, the applications 501, 506, and 508 are able to be executed. For example, when the icon of the application 501, 506, or 508 displayed on the display unit 206 is tapped, the control unit 201 executes the tapped application.

Hereinafter, operations implemented by the control unit 201 executing an OS or an application program are described with the control unit 201, OS, and application as the subject of the operation.

The OS 510 provides the function of controlling each unit of the communication apparatus 200. Also, the OS 510 provides various types of services to the application. For example, in the present embodiment, the function associated with communicating with an external device is implemented via a communication service 511 provided by the OS 510.

The communication service 511 controls the on/off of the communication function, connection to external apparatuses, and data communication with connected external apparatuses. The communication service 511 also controls providing applications with data provided via the communication function and exchanging data with external apparatuses according to a request from an application.

The file management application 506 provides a file management service 507 for managing a list of the data files stored in the storage medium 207. Also, the file management application 506 controls reading out data files managed by the file management service 507 from the storage medium 207 and writing data files according to a request from another application to the storage medium 207.

The image management application 508 provides an image management service 509 for managing a list of image data file (still image and moving image data files) stored in the storage medium 207. The image management application 508 differs from the file management application 506 in that it provides the function of displaying a list of thumbnail images of image data files on the display unit 206, the function of frame-by-frame viewing of moving images, and similar functions specialized for image data management.

Also, the image management application 508 controls reading out image data files managed by the image management service 509 from the storage medium 207 and writing image data files according to a request from another application to the storage medium 207.

The data files managed by the file management application 506 and the image data files managed by the image management application 508 are managed in independent areas in the storage medium 207, and they cannot reference one another.

Next, the transfer application 501 will be described. The transfer application 501 includes, as functions to provide, a display control function 502, a communication service control function 503, a file management service control function 504, and an image management service control function 505. The display control function 502 generates a screen that is displayed on the display unit 206. The screen configuration will be described below.

The communication service control function 503 of the transfer application 501 performs communication with the image capture apparatus 100 using the communication service 511 provided by the OS 510. Specifically, the communication service control function 503 obtains list information of the data files held by the image capture apparatus 100, each file information, data files, and the like from the image capture apparatus 100 using the communication service 511. Also, the communication service control function 503 reads out data files stored in the storage medium 207 and transmits them to the information processing apparatus 300 using the communication service 511.

The file management service control function 504 of the transfer application 501 stores data files stored in the working memory 204 in the storage medium 207 using the file management service 507 provided by the file management application 506.

The image management service control function 505 of the transfer application 501 stores image data files stored in the working memory 204 in the storage medium 207 using the image management service 509 provided by the image management application 508.

Use of a Plurality of Storage Mediums in Image Capture Apparatus 100

The image capture apparatus 100 according to the present embodiment includes a function of generating and storing two types of data with different data amounts from one image capture (hereinafter, referred to as the proxy content storing function). The image data with different data amounts are pieces of data that are different in terms of one or more of resolution, bit rate, frame rate, color depth, and encoding method. In the case of moving image data, the data amount for the accompanying audio data may also be different.

Hereinafter, of the two types of data, the data with the largest data amount is referred to as the main content and the data with a smaller data amount than the main content is referred to as the proxy content. Compared to the main content, the proxy content requires shorter time for transmission, image processing, and the like. Thus, the main content is suitable for uses that required high image quality and high audio quality, and the proxy content is suitable for uses where processing time is a priority.

For example, in the case of moving image data (including audio with the same applying hereinafter) used in a news program, when immediacy is required such as in the case of transmitting images in real time from a site, the proxy content is more suitable than the main content. On the other hand, in a case where high image quality and high audio quality are required over immediacy, the main content is more suitable.

Also, if only proxy content is stored, if high quality data becomes necessary after the fact, nothing can be done. Thus, it is advantageous to always store proxy content together with main content. Because of this, the image capture apparatus 100 including the proxy content storing function includes the function of separately storing main content and proxy content. Note that in addition to the main content and the proxy content, whether or not to store a metadata file can also be set.

In a case where both main content and proxy content are stored, first, the main content is generated, with the proxy content being able to be generated by reducing the data amount (reducing the bit rate) of the main content. Note that the present invention is not dependent on generation method for the main content and the proxy content, and any method can be used to generate the main content and the proxy content.

Figure 6A:
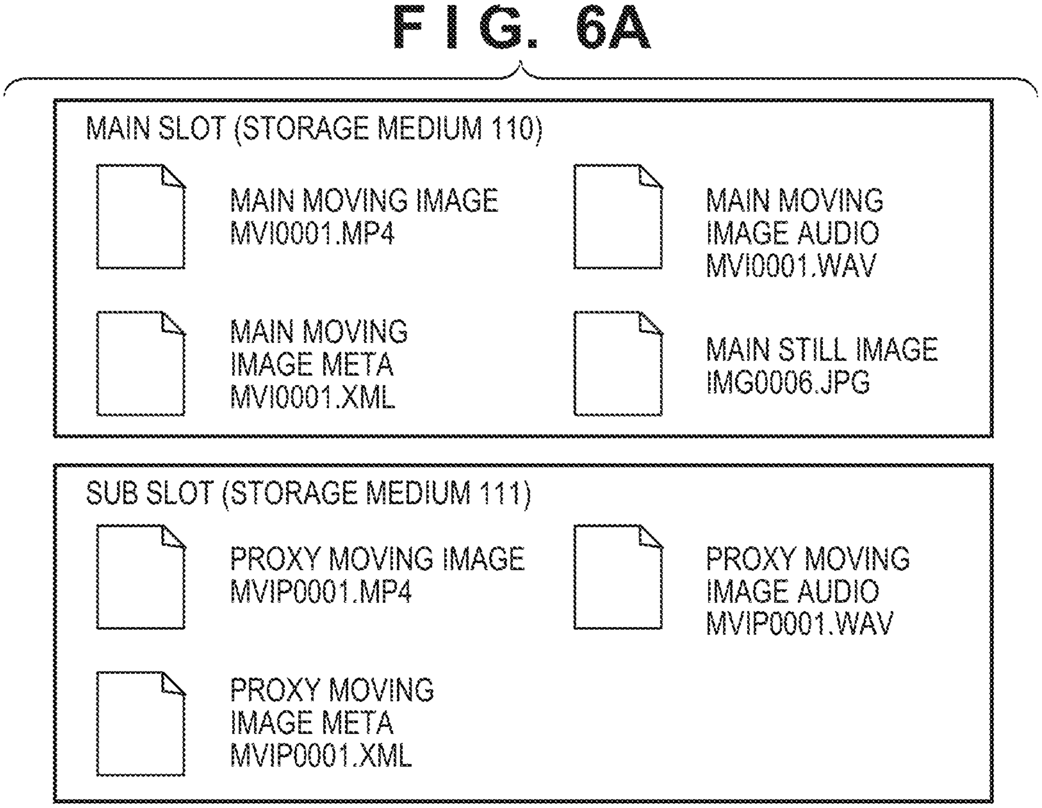
FIGS. 6A and 6B are diagrams illustrating examples of storage regulations for content files in the image capture apparatus.

FIG. 6A schematically illustrates files stored in each storage medium in the case of settings being set so that the image capture apparatus 100 with the proxy content storing function can use the storage medium 110 and the storage medium 111 and both main content and proxy content can be stored.

Here, the storage medium 110 and the storage medium 111 can be detached from the image capture apparatus 100, and the slot where the storage medium 110 is installed is referred to as the main slot, and the slot where the storage medium 111 is installed is referred to as the sub slot.

The control unit 101 determines the storage medium for storing data on the basis of the storage settings stored in the non-volatile memory 103. The storage settings include the data format or content type to be stored on the storage medium where each slot is installed, whether a metadata file needs to be stored, and the like. Possible settings include the main content being stored on the main slot and proxy content being stored on the sub slot, main content being stored on the main slot and slow motion images being stored on the sub slot, and the like. Basically, main content (including metadata) is stored on the main slot. Also, data different from the main content is stored simultaneously (in parallel with) the main content, with for example, sub content (including metadata) being stored on the sub slot.

Figure 6B:
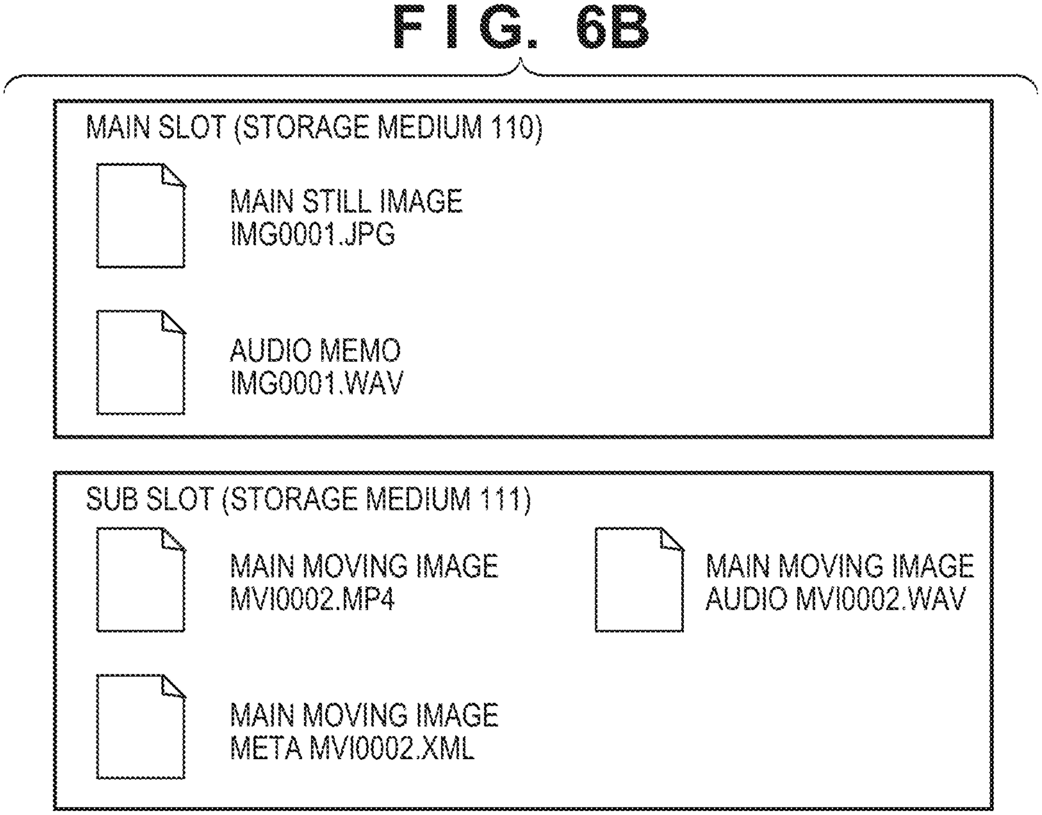

The storage settings vary depending on the type and model of the image capture apparatus 100. FIG. 6B schematically illustrates files stored in each storage medium in a case where the image capture apparatus 100 can use the storage medium 110 and the storage medium 111 mainly for still image capturing. The configuration takes into account the pressure of storage capacity for the main content, with the main still images being stored on the main slot and the main moving images being stored on the sub slot.

Note that in a case where only one of the storage medium 110 and the storage medium 111 are installed, the main content is stored on the installed storage medium. A storage medium that is installed but into which data cannot be written due to an abnormality or protection is treated as being not installed.

Screen Description

Next, the transfer application 501 will be described in detail. FIGS. 7A to 7D are diagrams illustrating examples of operation screens generated by the display control function 502 of the transfer application 501 and displayed on the display unit 206. Note that here, the transfer application 501 displays the main slot (storage medium 110) as "SD A" and the sub slot (storage medium 111) as "SD B".

The communication unit 112 of the image capture apparatus 100 operates in AP mode and forms a network. When the transfer application 501 is started up, the communication unit 211 of the communication apparatus 200 connects to the communication unit 112 operating as an access point. Note that the information (SSID and password) required to connect to the access point is set in advance and stored in the non-volatile memory 203.

Figure 7B:
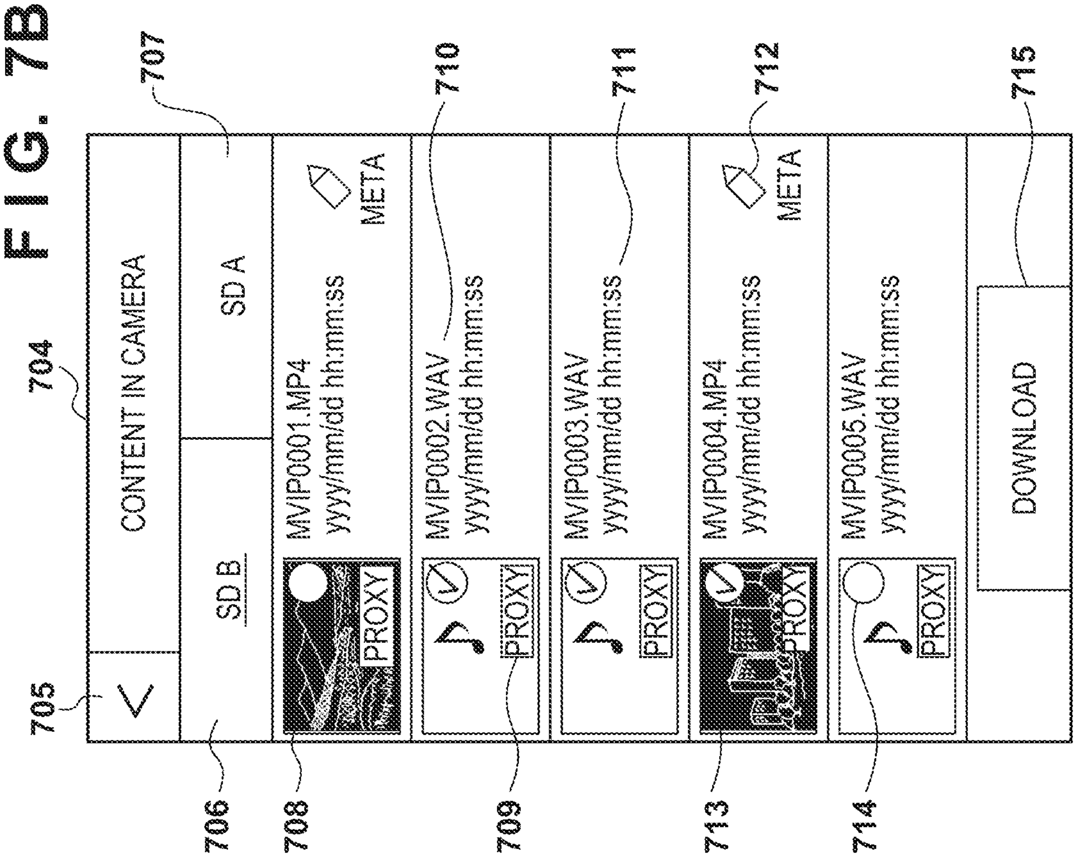
FIGS. 7A to 7D are diagrams illustrating examples of display screens for a transfer application that operates on the communication apparatus.
Figure 7A:
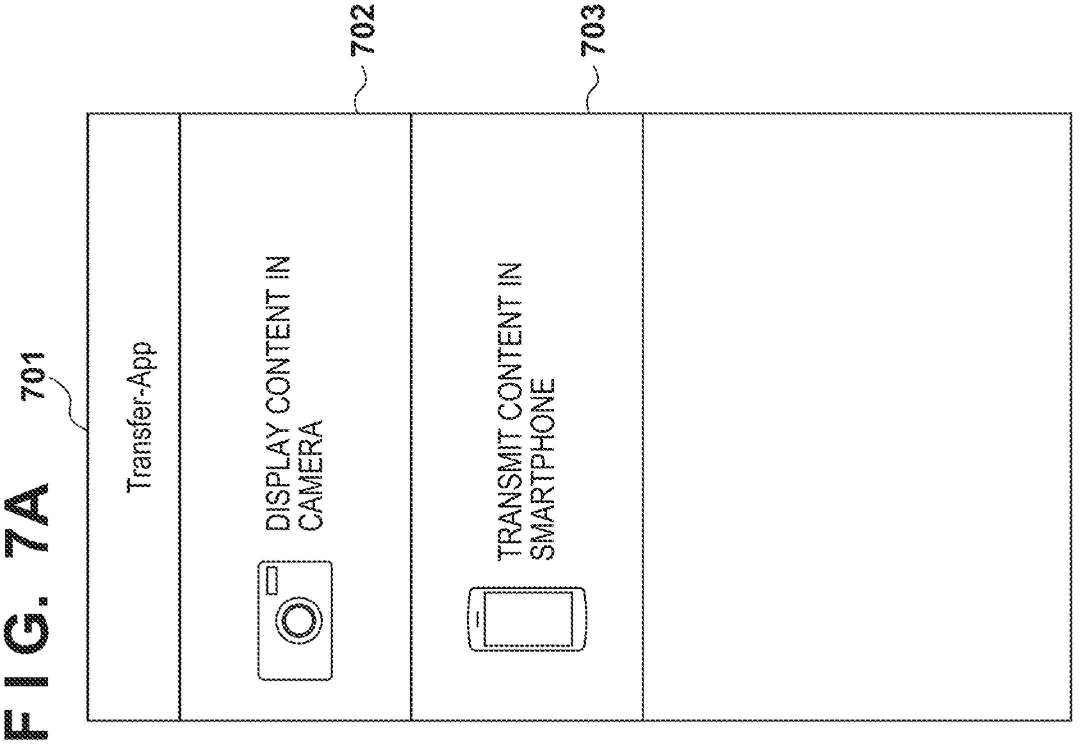

FIG. 7A illustrates an example of a function selection screen 701 displayed as an initial screen of the transfer application 501, with the communication apparatus 200 and the image capture apparatus 100 having an established wireless connection. The function selection screen 701 includes a button 702 for selecting to display the data files existing in the image capture apparatus 100 and a button 703 for selecting to display the data files existing in the storage medium 207 of the communication apparatus 200.

When the button 702 is tapped, the communication service control function 503 communicates with the image capture apparatus 100 and obtains the information of the data files existing in the image capture apparatus 100. The display control function 502 generates a file list display screen on the basis of the information obtained by the communication service control function 503. When the button 703 is tapped, the image management service control function 505 uses the image management service 509 to obtain the information of the image data files existing in the storage medium 207. The display control function 502 generates a screen displaying a list of the files on the basis of the information obtained by the image management service control function 505.

FIG. 7B illustrates an example of a file list display screen 704 displayed when the button 702 is tapped. A return button 705 is a button for returning to the function selection screen 701. Select media buttons 706 and 707 are buttons for selecting a medium or slot for list display in a case where the two storage mediums 110 and 111 are installed in the image capture apparatus 100 and readable. In the example of FIGS. 7A to 7D, SD B (storage medium 111) is in a selected state and a list of image data files (including audio data files accompanying moving image data files) stored in the storage medium 111 is displayed.

In the present embodiment, in a case where a list is displayed for each storage medium, a storage medium (or slot) to preferentially display is selected on the basis of the type and model information (type information and model information) of the image capture apparatus 100 connected to the communication apparatus 200 according to the flowchart of FIG. 8A described below. Here, SD B is in a selected state. When the select media button 707 is selected in this state, a list of the image data files stored in SD A (the storage medium 110) is displayed. Note that the format (extension or the like) of the data files displayed in a list may be able to be changed via the settings.

In the displayed list, for each data file, a thumbnail image 708, a file name (including extension) 710, a recording start date and time 711, and an icon 713 or 714 indicating the selection state are displayed. The thumbnail image 708 of a moving image data file may be stored in the file. The thumbnail image 708 of audio data may be stored in advance in the non-volatile memory 203 and used for an image indicating audio data. The icon 713 is displayed for a data file in a selected state, and the icon 714 is displayed for a data file in a non-selected state. For example, each time the inside of the region displaying the information of each data file is tapped, the state of the data file switches from the selected state to the non-selected state, with the display of the icons 713 and 714 also switching.

Also, for a data file associated with proxy content, an icon 709 is superimposed on the thumbnail image 708. Note that in the present embodiment, the display control function 502 recognizes data files with "P" as the fourth character of the file name as data files associated with proxy content and adds the icon 709. However, for example, this may be recognized via another method such as writing information indicating whether it is main content or proxy content in the header of the data file and referencing this. In the example of FIG. 7B, all data files are determined to be data files associated with proxy content.

Also, for a moving image data file with a metadata file that exists in the same storage medium, an icon 712 indicating this is additionally displayed. Here, the icon 712 is added to a moving image data file for which a file with the same file name excluding the extension and the extension being "XML" exists. Note that another method may be used to recognize whether or not the file is a metadata file.

A download button 715 is a button for issuing an instruction to the control unit 201 to download the selected data file in the list display screen 704 from the image capture apparatus 100 to the communication apparatus 200. When operation (a tap) of the download button 715 is detected, the control unit 201 obtains the selected data file in the list display screen 704 from the image capture apparatus 100. The control unit 201, after temporarily storing the obtained data file on the storage medium 207 or the working memory 204, transfers it to the information processing apparatus 300. Note that the communication connection with the information processing apparatus 300 can be established at any time before transfer.

Figure 7D:
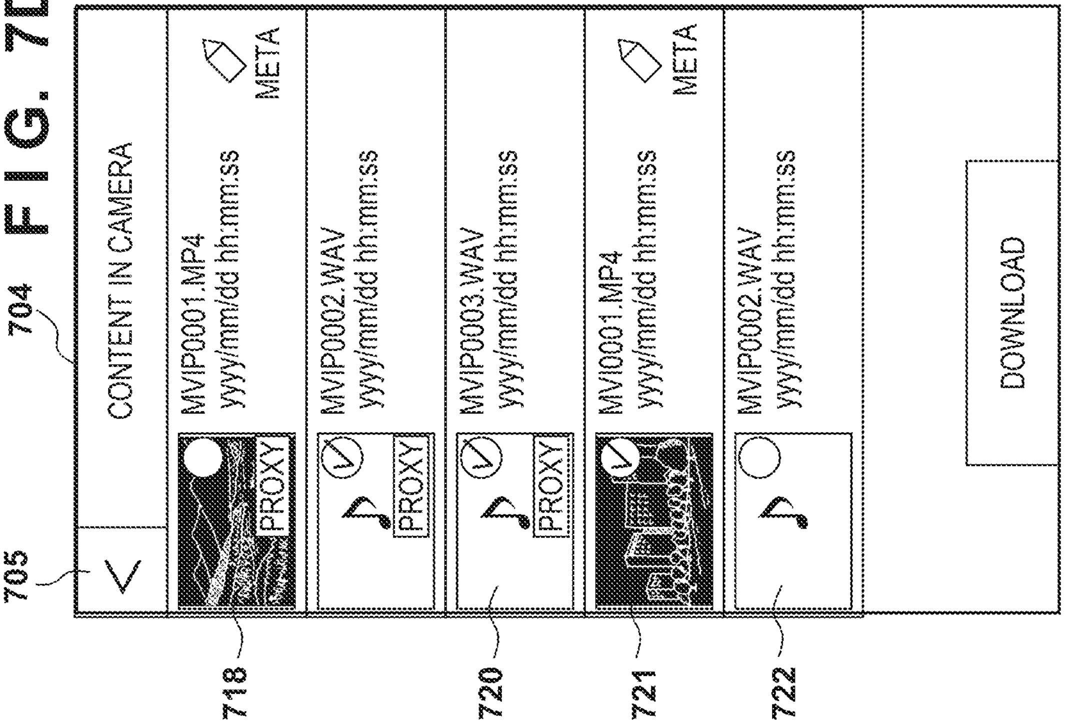
Figure 7C:
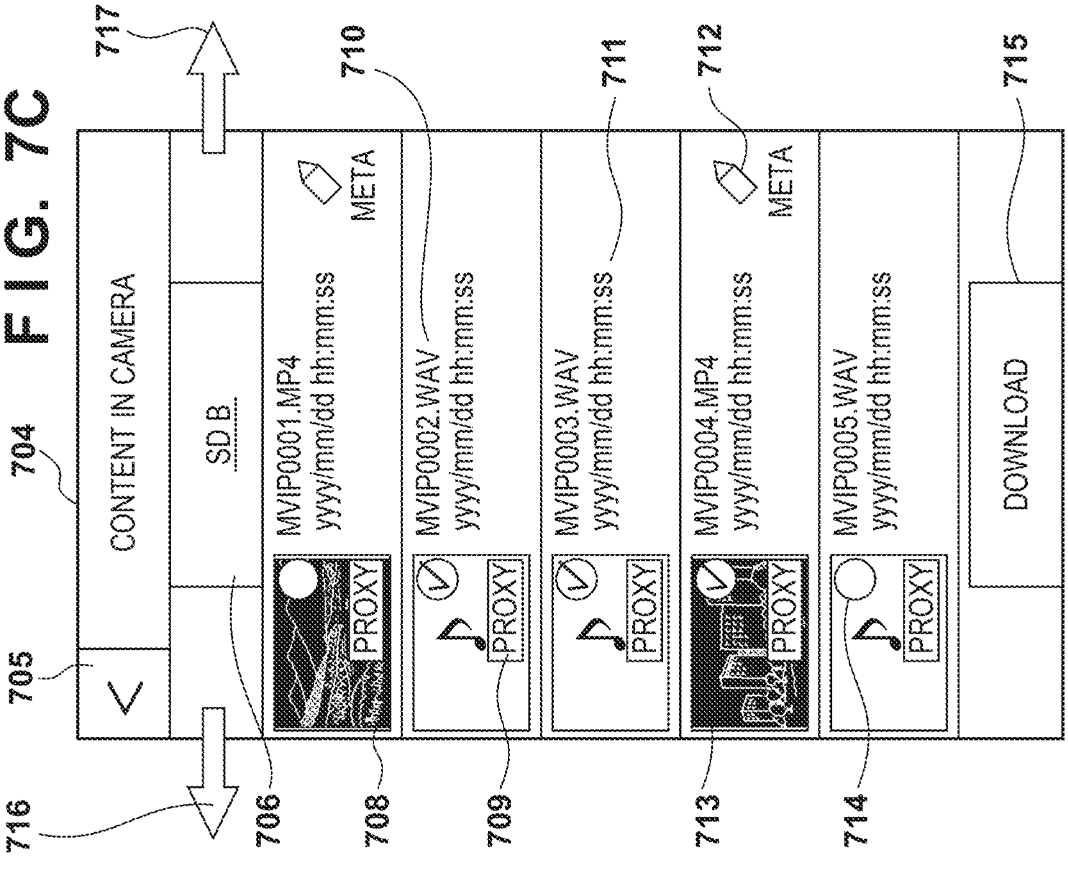

FIG. 7C is a diagram illustrating another example of the list display screen 704. In this example, in a case where the two storage mediums, the storage medium 110 and the storage medium 111, are installed in the image capture apparatus 100 and are readable, only the select media button of the storage medium that has its list displayed is displayed. In FIG. 7C, since the storage medium 111 is the list display target, only the select media button 706 is displayed.

The select media button 706 can be flicked in the left-and-right direction as illustrated by arrows 716 and 717. Also, when there is a flick operation on the select media button 706 in the left or right direction, the list display target changes to the storage medium 110. Note that an icon or the like may be displayed to indicate whether the displayed select media button can be flicked.

In FIGS. 7B and 7C, in a case where the button 702 on the function selection screen 701 is tapped, a list of the contents of SD B selected as the storage medium to be preferentially displayed according to the flowchart of FIG. 8A described below is preferentially displayed. The storage medium that is the list display target is switched by a tap operation of the select media button 707 in the example of FIG. 7B and by a flick operation of the select media button 706 in the example of FIG. 7C to display a list of the main content stored in SD A.

FIG. 7D is a diagram illustrating yet another example of the list display screen 704. In this example, when files stored in the storage medium 110 and the storage medium 111 of the image capture apparatus 100 are collectively displayed as a list, the files of the storage medium (slot) selected as the storage medium to preferentially display according to the flowchart of FIG. 8A described below is preferentially displayed. In FIG. 7D, files 718 to 720 of the storage medium 111 (sub slot) are preferentially displayed (displayed at the top), and files 721 and 722 of the storage medium 110 (main slot) are displayed underneath the files of the storage medium 111.

Typically, in a case where the file information of an apparatus including a plurality of storage mediums is displayed using a file transfer application, the main slot is identified on the basis of a volume label and the file information of the main slot is preferentially displayed. The file transfer application, for example, identifies, as the main slot, the slot that includes a volume label (name) corresponding to the top position when sorted alphabetically in descending order.

For example, in the case of the image capture apparatus 100 according to the present embodiment, since the volume label of the main slot is SD A and the volume label of the sub slot is SD B, the file transfer application identifies SD A as the main slot. Note that, depending on regulations involving volume labels, the sorting targets may be restricted to a portion of the volume labels or a storage medium to prioritize may be determined by a different sorting method. For example, in the case of a volume label for the image capture apparatus 100, the top three characters ("SD") are not sorting targets. Also, the main slot may be identified taking into account other conditions such as putting volume labels starting with "CF" higher than volume labels starting with "SD".

In this manner, of the plurality of slots (storage media), with a configuration that always prioritizes the main slot when displaying file information, the user's needs are not always met. For example, in a case where the user prioritizes timeliness and uses the proxy content storing function, the proxy content information is desirably preferentially displayed. The image capture apparatus 100 according to the present embodiment is set with the main content being stored on the main slot and the proxy content being stored on the sub slot. In such a case, for the communication apparatus 200 to display the proxy content information, the user must switch the storage medium (slot) for list display to the sub slot. Also, in a case where the sub slot file information is not obtained, to response to a switch instruction and obtain the information, time is needed to display the list.

Figure 8A:
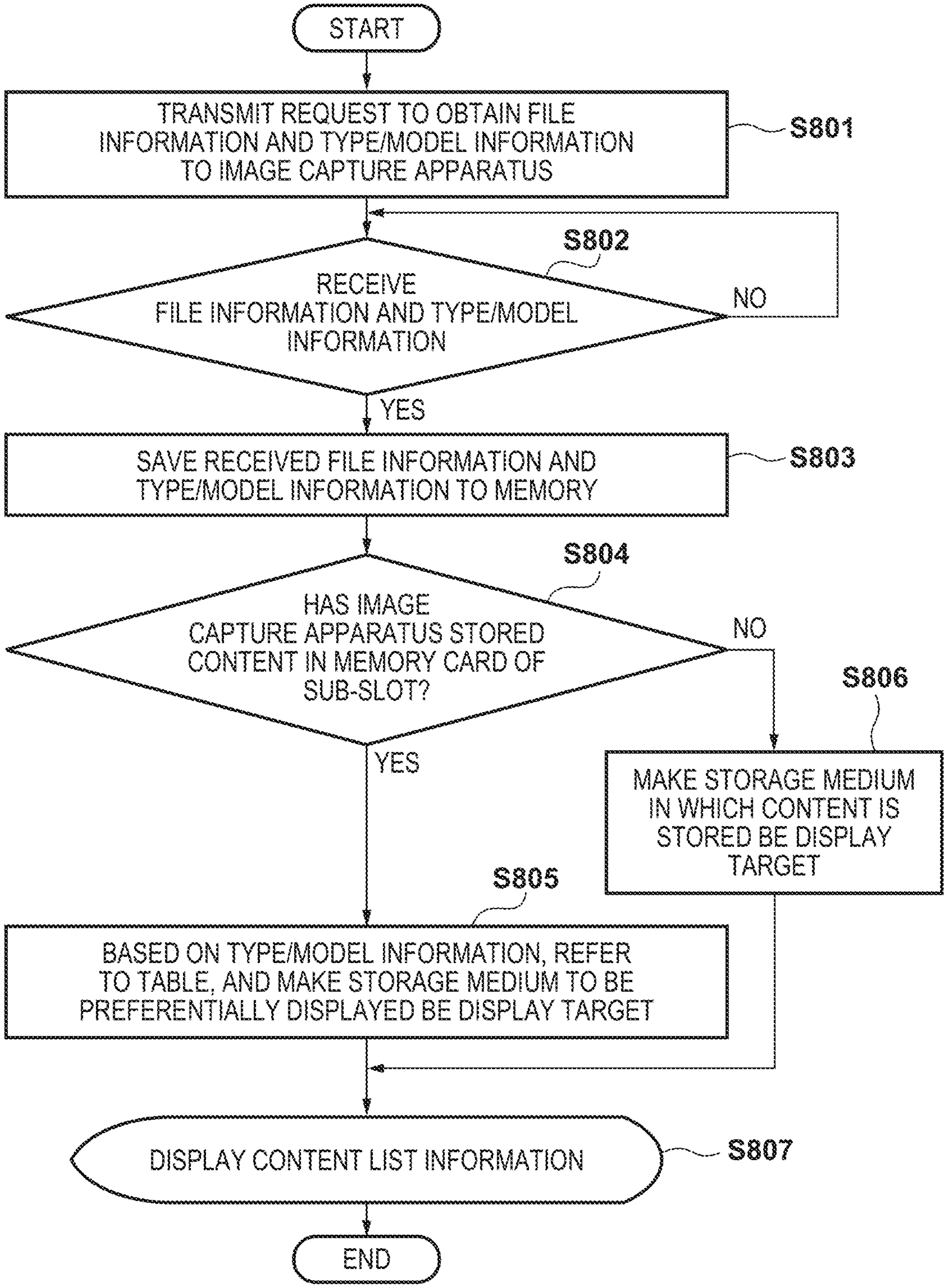
FIGS. 8A and 8B are flowcharts relating to the operations of the communication apparatus.

In the present embodiment, to solve the problem of such known technology, the storage medium (slot) for preferentially displaying file information is determined according to the flowchart of FIG. 8A. Specifically, the storage medium to be preferentially displayed is determined on the basis of the type and model information of the image capture apparatus 100 connected to the communication apparatus 200 and information relating to the proxy content storing function.

Figures 8B, 9:
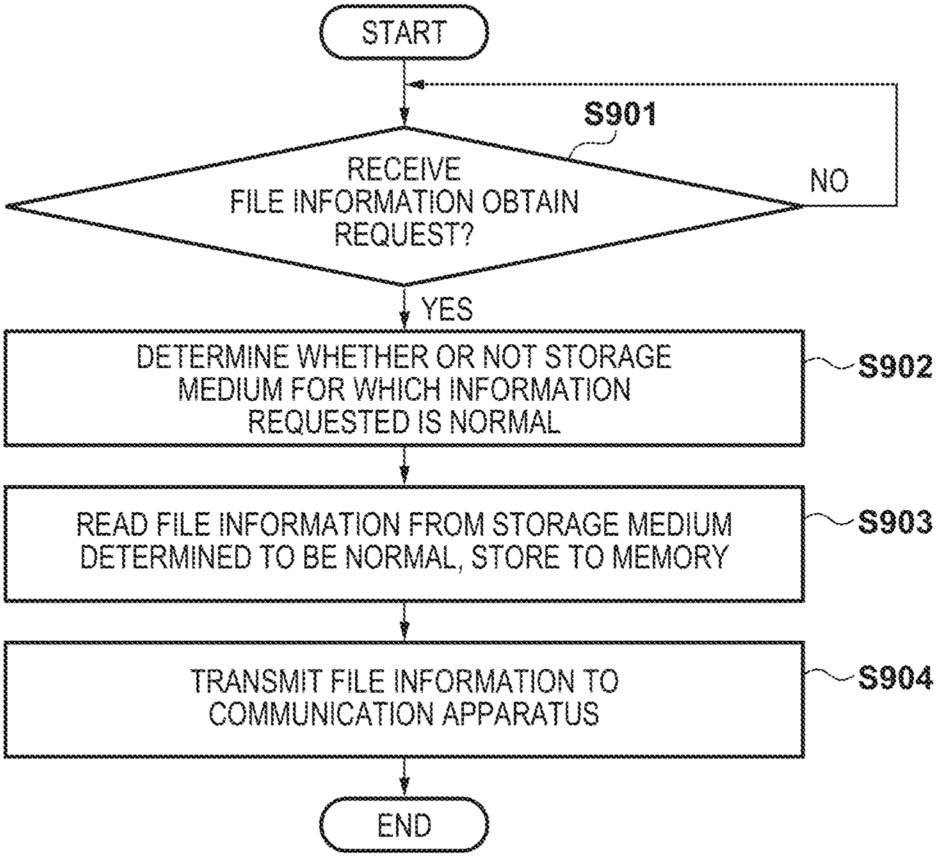
FIG. 9 is a flowchart relating to the operations of the image capture apparatus.

FIG. 8A is a flowchart relating to the operation of the transfer application 501 in a state where a communication connection has been established between the communication apparatus 200 and the image capture apparatus 100. The operations illustrated in FIGS. 8A and 8B are started by an operation (for example, a tap) of the button 702 being detected, in a state where the transfer application 501 has been started up and the function selection screen 701 illustrated in FIG. 7A is displayed, for example.

In step S801 (hereinafter, "step" will be omitted), the control unit 201 of the communication apparatus 200 transmits a file information obtain request for requesting each piece of stored file information to the image capture apparatus 100 via the communication unit 211. Also, a type and model information obtain request for the image capture apparatus 100 and a function information obtain request for the proxy content storing function are transmitted. Here, the proxy content storing function information is information including whether or not the image capture apparatus 100 includes a proxy content storing function and whether the proxy content function is set to enabled (is the function on or oft) in the case of this function being included. This information is obtained by being obtained on the basis of information prepared in advance in the application of the communication apparatus 200, obtained from the settings of the image capture apparatus 100, obtained from the user settings of the image capture apparatus 100, obtained by querying a predetermined server, or a similar method.

Note that in a case where the image capture apparatus 100 includes a plurality of storage mediums, the control unit 201 requests file information for each storage medium. The file information may include but is not limited to including a file name, a file format, a recording date and time, a recording time, a thumbnail image, and the like. Note that to simplify the description and understanding, in this example, the required file information is all obtained with one request. However, the file information for one file may be obtained via a plurality of requests and responses.

In S802, the control unit 201 determines whether the file information, the type and model information, and the proxy content storing function information transmitted from the image capture apparatus 100 in response to the file information obtain request, the type and model information obtain request for the image capture apparatus 100, and the function information obtain request for the proxy content storing function received in S801 have been received. In a case where the control unit 201 determines that the file information, the type and model information, and the proxy content storing function information have been received, the processing proceeds to S803. Also, in a case where it is not determined that the file information, the type and model information, and the proxy content storing function information have been received, the processing of S802 is repeated.

In S803, the control unit 201 receives the file information, the type and model information, and the proxy content storing function information transmitted by the image capture apparatus 100 via the communication unit 211 and stores them in the working memory 204.

In S804, the control unit 201 determines from the file information stored in the working memory 204 whether a content file is stored in the plurality of storage mediums. The control unit 201 can identify still image files, moving image files, main content files, and proxy content files on the basis of the file name and extension as described above, for example.

In a case where it is determined that there is one storage medium storing a content file, the control unit 201 proceeds the processing to S806. In S806, the control unit 201 determines to make the storage medium storing the content file the list display target and proceeds the processing to S807.

On the other hand, in a case where it is determined that there are a plurality of storage mediums storing a content file, the control unit 201 proceeds the processing to S805. In S805, the control unit 201 references the table of FIG. 8B storing the slots to be preferentially displayed prepared in advance in the transfer application 501 on the basis of the type and model information and proxy content storing function information of the image capture apparatus 100 stored in the working memory 204. Then, the storage medium to be the list display target is determined, and the processing proceeds to S807. In the present embodiment, the storage medium to be the list display target is determined to be SD B of slot 2 displayed in bold corresponding to type M, model MA, and proxy storing ON (at the top of FIG. 8B).

In S807, the control unit 201 displays the list display screen 704 displaying a list of the information of the content files stored in the storage medium determined to be the display target in S805 or S806.

In the table illustrated in FIG. 8B, the types are split into type M for mainly moving image capture and type S for mainly still image capture. Type M and the proxy content storing function turned on corresponds to a setting for preferentially displaying slot 2 where proxy moving images are stored. Type S and a model that does not include a proxy content storing function or that includes a proxy content storing function but it is treated as a sub-function corresponds to a setting for preferentially displaying slot 1 where still images and main moving images are stored.

Accordingly, in the case of an image capture apparatus of an type M required to transmit images in real time and the proxy content storing function being on, the storage medium (sub slot in the example of FIG. 6A) where proxy content files are stored is the list display target. Thus, the control unit 201 displays the list display screen 704 as illustrated in FIG. 7B or 7C.

Note that the following applies to a case where there is one storage medium where a content file is stored and a main content file and a proxy content file are stored in the same storage medium. In other words, if the proxy content storing function is on and the condition is to preferentially display the sub slot in FIG. 8B, the control unit 201 preferentially displays a list of the proxy content files. Also, the following applies to a case where a main content file and a proxy content file are stored together in one storage medium. In other words, if the proxy content storing function is on and the condition is to preferentially display the sub slot in FIG. 8B, the control unit 201 preferentially displays a list of the proxy content files. In these cases, as illustrated in FIG. 7D, for example, the control unit 201 can display a list so that the proxy content files are displayed higher than the main content files.

FIG. 9 is a flowchart relating to the operations of the image capture apparatus 100 corresponding to the operations of the communication apparatus 200 described using FIGS. 8A and 8B.

In S901, the control unit 101 determines whether a file information obtain request, a type and model information obtain request of the image capture apparatus 100, and a function information obtain request for the proxy content storing function transmitted from the communication apparatus 200 have been received via the communication unit 112. In a case where they have been received, the control unit 101 proceeds the processing to S902. Otherwise, the control unit 101 repeats the processing of S901.

In S902, the control unit 101 determines whether or not the storage medium requested for file information is normal (is readable) and stores the determination result in the working memory 104.

In S903, the control unit 101 stores the file information, the type and model information, and the proxy content storing function information stored in the storage medium determined to be readable in S902 in the working memory 104.

In S904, the control unit 101 transmits the file information, the type and model information, and the proxy content storing function information stored in the working memory 104 to the communication apparatus 200 via the communication unit 211. Note that in a case where the storage medium is not determined to be normal in S902, for the storage medium, the control unit 101 responds with an error instead of file information.

In this manner, according to the present embodiment, the communication apparatus 200, of the content files stored in the image capture apparatus 100, can prioritize proxy content for an image capture apparatus that mainly handles proxy content suitable for cases where immediacy is required in transfer and can display a list thereof. On the other hand, for an image capture apparatus that mainly handles still images or that does not include a proxy content storing function, a list of the main content can be preferentially displayed. At this time, the user does not need to be aware of whether the main content files and the proxy content files are stored by the image capture apparatus 100 in one or a plurality of storage mediums and by what regulation. Thus, an operation to display the proxy content files is unnecessary, and the amount of time required to transfer to the information processing apparatus 300 can be further reduced.

MODIFIED EXAMPLE

According to the embodiment described above, the following applies in a case where the type and model information of the image capture apparatus 100 is not in the table (FIG. 8B) prepared in advance in the transfer application 501. In other words, regarding updating information in the table storing the slot to be preferentially displayed, the control unit 201 updates the table by querying a predetermined server via the communication unit 211.

Also, in FIG. 8B, the types are split into two types, type M and type S. However, no such limitation is intended. Also, the setting is divided by the proxy content storing function, but in another configuration, the setting may be divided by a function setting linked to another file storing function.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-023038, filed Feb. 19, 2024, which is hereby incorporated by reference herein in its entirety.

What is claimed is:

1. A communication apparatus comprising:

at least one processor or circuit and a memory storing instructions to cause the at least one processor or circuit to perform operations of the following units:

a first obtaining unit configured to obtain information of a plurality of image data files from a first external apparatus storing the plurality of image data files using at least one of a plurality of storage mediums;

a display control unit configured to display at least a portion of the information of the plurality of image data files on a display device;

a selecting unit configured to select at least one image data file from the information of the plurality of image data files displayed on the display device;

a second obtaining unit configured to obtain an image data file selected by the selecting unit from the first external apparatus; and a transferring unit configured to transfer the obtained image data file to a second external apparatus different from the first external apparatus, wherein if the first external apparatus has recorded image data on only one storage medium, the display control unit selects the only one storage medium on which the plurality of image data files are recorded as the target for displaying information about the image data files, and wherein if the first external apparatus has recorded the plurality of image data files on multiple storage media, the display control unit determines a storage medium on which information about the image data files is to be preferentially displayed on the display device based on whether the first external apparatus is a type that primarily captures still images or a type that primarily captures moving images.

2. The communication apparatus according to claim 1, wherein the display control unit displays the information of the image data file determined to be preferentially displayed on the display device.

3. The communication apparatus according to claim 1, wherein the first obtaining unit can obtain information of image data files stored in a plurality of storage mediums installed in a plurality of slots provided in the first external apparatus.

4. The communication apparatus according to claim 1, wherein the display control unit determines which storage medium, from among the plurality of storage mediums, to preferentially display, on the display device, information of an image data file stored thereon on a further basis of information of whether or not the first external apparatus includes a proxy content storing function for storing proxy content corresponding to a main content file but with a lower data amount than the main content file.

5. The communication apparatus according to claim 4, wherein the display control unit obtains the information of whether or not the first external apparatus includes the proxy content storing function on a basis of information prepared in advance in an application of the communication apparatus.

6. The communication apparatus according to claim 4, wherein the display control unit obtains the information of whether or not the first external apparatus includes the proxy content storing function by querying a predetermined server.

7. The communication apparatus according to claim 4, wherein the display control unit obtains the information of whether or not the first external apparatus includes the proxy content storing function from the first external apparatus.

8. The communication apparatus according to claim 7, wherein the display control unit obtains the information of whether or not the first external apparatus includes the proxy content storing function from user settings of the first external apparatus.

9. A method of controlling a communication apparatus comprising:

obtaining information of a plurality of image data files from a first external apparatus storing the plurality of image data files using at least one of a plurality of storage mediums;

performing display control to display at least a portion of the information of the plurality of image data files on a display device;

selecting at least one image data file from the information of the plurality of image data files displayed on the display device;

obtaining an image data file selected by the selecting from the first external apparatus;

transferring the obtained image data file to a second external apparatus different from the first external apparatus, wherein the display control determines, from among the plurality of storage mediums, a storage medium on which information about the image data files is to be preferentially displayed on the display device based on whether the first external apparatus is a type that primarily captures still images or a type that primarily captures moving images.

10. A non-transitory computer-readable storage medium storing a program for causing a computer to function as each unit of the communication apparatus comprising:

a first obtaining unit configured to obtain information of a plurality of image data files from a first external apparatus storing the plurality of image data files using at least one of a plurality of storage mediums;

a display control unit configured to display at least a portion of the information of the plurality of image data files on a display device;

a selecting unit configured to select at least one image data file from the information of the plurality of image data files displayed on the display device;

a second obtaining unit configured to obtain an image data file selected by the selecting unit from the first external apparatus; and a transferring unit configured to transfer the obtained image data file to a second external apparatus different from the first external apparatus, wherein if the first external apparatus has recorded image data on only one storage medium, the display control unit selects the only one storage medium on which the plurality of image data files are recorded as the target for displaying information about the image data files, and wherein if the first external apparatus has recorded the plurality of image data files on multiple storage media, the display control unit determines a storage medium on which information about the image data files is to be preferentially displayed on the display device based on whether the first external apparatus is a type that primarily captures still images or a type that primarily captures moving images.

* * * * *